(12) United States Patent
Muharemovic et al.

(10) Patent No.: US 8,457,039 B2
(45) Date of Patent: Jun. 4, 2013

(54) RANDOM ACCESS CHANNEL DESIGN WITH HYBRID CDM AND FDM MULTIPLEXING OF ACCESS

(75) Inventors: Tarik Muharemovic, Dallas, TX (US); Pierre Bertrand, Antibes (FR); Jing Jiang, Allen, TX (US); Zukang Shen, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 569 days.

(21) Appl. No.: 11/877,533

(22) Filed: Oct. 23, 2007

(65) Prior Publication Data

US 2008/0095254 A1 Apr. 24, 2008

Related U.S. Application Data

(60) Provisional application No. 60/862,701, filed on Oct. 24, 2006, provisional application No. 60/883,942, filed on Jan. 8, 2007.

(51) Int. Cl.
*H04B 7/204* (2006.01)
*H04J 11/00* (2006.01)
*H04L 7/06* (2006.01)

(52) U.S. Cl.
USPC ........... 370/319; 370/208; 370/210; 370/335; 370/343; 375/364

(58) Field of Classification Search
USPC ................ 370/208, 210, 335, 342, 441, 349, 370/385, 319, 343; 375/130, 140, 146, 362–367; 708/400–405
See application file for complete search history.

(56) References Cited

U.S. PATENT DOCUMENTS

| 6,438,183 | B1 * | 8/2002 | Taura et al. ................... 375/343 |
| 6,970,438 | B2 * | 11/2005 | Mate et al. .................... 370/329 |
| 7,263,058 | B2 * | 8/2007 | Joo ................................. 370/203 |
| 7,388,910 | B2 * | 6/2008 | McKown ....................... 375/232 |
| 7,418,046 | B2 * | 8/2008 | Gore et al. .................... 375/260 |
| 2002/0086707 | A1 * | 7/2002 | Struhsaker et al. ........... 455/561 |

(Continued)

FOREIGN PATENT DOCUMENTS

| DE | 103 41 546 A1 | 1/2005 |
| WO | WO 2006069176 | 6/2006 |

OTHER PUBLICATIONS

"Physical Channels and Procedures at the Air Interface", Timm-Giel, [retrieved from Universitat Bremen, <URL: http://www.comnets.uni-bremen.de/typo3site/uploads/media/ngms_ch47_part3_1706_v1.pdf>], May 27, 2004, pp. 95, 98, 115-117, 122-126.

(Continued)

*Primary Examiner* — Michael Thier
*Assistant Examiner* — Awet Haile
(74) *Attorney, Agent, or Firm* — Ronald O. Neerings; Wade James Brady, III; Frederick J. Telecky, Jr.

(57) ABSTRACT

A method of establishing communications with a remote receiver (300) that receives data signals (612, 614) from other transmitters is disclosed. The method includes producing a preamble (602) and producing guard bands (800, 802) between the preamble and the data signals. The preamble is transmitted (111) to the remote receiver.

21 Claims, 9 Drawing Sheets

U.S. PATENT DOCUMENTS

| | | | | |
|---|---|---|---|---|
| 2003/0152023 | A1* | 8/2003 | Hosur et al. | 370/208 |
| 2004/0165650 | A1* | 8/2004 | Miyazaki et al. | 375/141 |
| 2004/0170157 | A1* | 9/2004 | Kim et al. | 370/349 |
| 2005/0002361 | A1* | 1/2005 | Dick et al. | 370/335 |
| 2005/0036541 | A1* | 2/2005 | McKown | 375/233 |
| 2006/0050799 | A1* | 3/2006 | Hou et al. | 375/260 |
| 2006/0146869 | A1* | 7/2006 | Zhang et al. | 370/465 |
| 2007/0072600 | A1* | 3/2007 | Cho et al. | 455/423 |
| 2007/0291696 | A1* | 12/2007 | Zhang et al. | 370/331 |
| 2008/0107211 | A1* | 5/2008 | Min et al. | 375/326 |

OTHER PUBLICATIONS

Masson, "E-UTRA RACH within the LTE system," XR-EE-KT 2006:002, Master's Degree Project (Feb. 2006).

Texas Instruments, "On Allocation of Uplink Pilot Sub-Channels in EUTRA SC-FDMA," 3GPP TSG RAN WG1 Ad hoc on LTE, No. R1-050822 (Aug. 29-Sep. 2, 2005).

Nortel Networks, "Consideration on UL RACH scheme for LTE," 3GPP RAN1 meeting #44, No. R1-060653 (Feb. 13-17, 2006).

* cited by examiner

| NSRA STRUCTURE | NSRA SUB-CARRIER SPACING (kHz) | NUMBER ALLOCATED SUB-CARRIERS TO NSRA BURST | PREAMBLE SIZE | | PREAMBLE SAMPLING RATE (MHz) | SPECTRUM ALLOCATION (MHz) | SYSTEM SAMPLING RATE (MHz) | IDFT SAMPLES | CP DURATION (μs/SAMPLES) | | GT DURATION (μs/SAMPLES) | |
|---|---|---|---|---|---|---|---|---|---|---|---|---|
| | | | μs | NUMBER OF OCCUPIED SUB-CARRIERS | | | | | | | | |
| BASELINE | 1.25 | 864 | 800 | 839 | 1.04875 | 1.25 | 1.92 | 1536 | 102.60 | 197 | 97.40 | 187 |
| | | | | | | 2.5 | 3.84 | 3072 | | 394 | | 374 |
| | | | | | | 5 | 7.68 | 6144 | | 788 | | 748 |
| | | | | | | 10 | 15.36 | 12288 | | 1576 | | 1496 |
| | | | | | | 15 | 23.04 | 18432 | | 2364 | | 2244 |
| | | | | | | 20 | 30.72 | 24576 | | 3152 | | 2992 |
| ALTERNATE | 2.5 | 432 | 400 | 421 | 1.0525 | 1.25 | 1.92 | 768 | 53.13 | 102 | 46.88 | 90 |
| | | | | | | 2.5 | 3.84 | 1536 | | 204 | | 180 |
| | | | | | | 5 | 7.68 | 3072 | | 408 | | 360 |
| | | | | | | 10 | 15.36 | 6144 | | 816 | | 720 |
| | | | | | | 15 | 23.04 | 9216 | | 1224 | | 1080 |
| | | | | | | 20 | 30.72 | 12288 | | 1632 | | 1440 |

FIG. 13

RANDOM ACCESS CHANNEL DESIGN WITH HYBRID CDM AND FDM MULTIPLEXING OF ACCESS

CROSS-REFERENCES TO RELATED APPLICATIONS

This application claims the benefit, under 35 U.S.C. §119 (e)(1), of U.S. Provisional Application No. 60/862,701, filed Oct. 24, 2006, and Provisional Application No. 60/883,942, filed Jan. 8, 2007, and both incorporated herein by this reference in their entirety. This application claims the benefit, under 35 U.S.C. §120, of U.S. application Ser. No. 11/691,549, filed Mar. 27, 2007, and incorporated herein by this reference in its entirety.

BACKGROUND OF THE INVENTION

The present embodiments relate to communication systems and, more particularly, to Random Access Channel (RACH) design for Orthogonal Frequency Division Multiplex (OFDM) communication systems.

Wireless communications are prevalent in business, personal, and other applications, and as a result the technology for such communications continues to advance in various areas. One such advancement includes the use of spread spectrum communications, including that of code division multiple access (CDMA) which includes wideband code division multiple access (WCDMA) cellular communications. In CDMA communications, user equipment (UE) (e.g., a hand held cellular phone, personal digital assistant or other) communicates with a base station (Node B), where typically the base station corresponds to a "cell." CDMA communications are by way of transmitting symbols from a transmitter to a receiver, and the symbols are modulated using a spreading code which consists of a series of binary pulses. The code runs at a higher rate than the symbol rate and determines the actual transmission bandwidth. In the current industry, each piece of CDMA signal transmitted according to this code is said to be a "chip," where each chip corresponds to an element in the CDMA code. Thus, the chip frequency defines the rate of the CDMA code. WCDMA includes alternative methods of data transfer, one being frequency division duplex (FDD) and another being time division duplex (TDD), where the uplink and downlink channels are asymmetric for FDD and symmetric for TDD. Another wireless standard involves time division multiple access (TDMA) apparatus, which also communicate symbols and are used by way of example in cellular systems. TDMA communications are transmitted as a group of packets in a time period, where the time period is divided into time slots so that multiple receivers may each access meaningful information during a different part of that time period. In other words, in a group of TDMA receivers, each receiver is designated a time slot in the time period, and that time slot repeats for each group of successive packets transmitted to the receiver. Accordingly, each receiver is able to identify the information intended for it by synchronizing to the group of packets and then deciphering the time slot corresponding to the given receiver. Given the preceding, CDMA transmissions are receiver-distinguished in response to codes, while TDMA transmissions are receiver-distinguished in response to time slots.

The 3rd Generation Partnership Project (3GPP) with a view toward Long Term Evolution (LTE) of wireless standards has adopted Orthogonal Frequency Division Multiplex (OFDM) transmission. With OFDM, multiple symbols are transmitted on multiple carriers that are spaced apart to provide orthogonality. An OFDM modulator typically takes data symbols into a serial-to-parallel converter, and the output of the serial-to-parallel converter is considered as frequency domain data symbols. An inverse fast Fourier transform (IFFT) converts the frequency domain data symbols into a time domain waveform. The IFFT structure allows the frequency tones to be orthogonal. A cyclic prefix is formed by copying the tail samples from the time domain waveform and appending them to the front of the waveform. The time domain waveform with cyclic prefix is termed an OFDM symbol, and this OFDM symbol may be upconverted to an RF frequency and transmitted. An OFDM receiver may recover the timing and carrier frequency and then process the received samples through a fast Fourier transform (FFT). The cyclic prefix may be discarded and after the FFT, frequency domain information is recovered. The pilot symbols may be recovered to aid in channel estimation so that the data sent on the frequency tones can be recovered. A parallel-to-serial converter is applied, and the data is sent to the channel decoder. Just as with other communication systems, OFDM communications may be performed in an FDD mode or in a TDD mode.

While the preceding approaches provide steady improvements in wireless communications, the present inventors recognize that still further improvements may be made by addressing some of the drawbacks of the prior art. In particular, orthogonal uplink transmissions among UEs and initial communication with Node B over a Random Access Channel (RACH) are significant concerns. Accordingly, the preferred embodiments described below are directed toward these problems as well as improving upon the prior art.

BRIEF SUMMARY OF THE INVENTION

In a first preferred embodiment, there is disclosed a method of establishing communications with a remote receiver that receives data signals from other transmitters. The method includes producing a preamble, producing guard band frequencies between the preamble and the data signals, and transmitting the preamble to the remote receiver.

In a second preferred embodiment, there is disclosed a method of establishing communications with a remote receiver that receives data signals from other transmitters. The method includes selecting a Constant Amplitude Zero Auto Correlation (CAZAC) sequence from a plurality of CAZAC sequences, producing a preamble from the selected CAZAC sequence, and transmitting the preamble to a remote receiver.

In a third preferred embodiment, there is disclosed a method of establishing communications with a remote receiver. The method includes receiving data signals having a first bandwidth from a first receiver and receiving a preamble having a second bandwidth from the remote receiver. The second bandwidth is separated from the first bandwidth by a guard band. Receipt of the preamble is acknowledged to the remote receiver.

BRIEF DESCRIPTION OF THE SEVERAL VIEWS OF THE DRAWING

FIG. 13 is a table showing Baseline and Alternate preamble specifications according to the present invention.

DETAILED DESCRIPTION OF THE INVENTION

The preferred embodiments of the present invention provide improved communication establishment between user equipment (UF) and a base station (Node B) over a Random Access Channel (RACH). The improved communication is provided by a preamble formed with a selected Constant Amplitude Zero Auto Correlation (CAZAC) sequence. Frequency guard bands are included at preamble boundaries to reduce crosstalk with data signals from other UEs as will be explained in detail.

Figure 1:
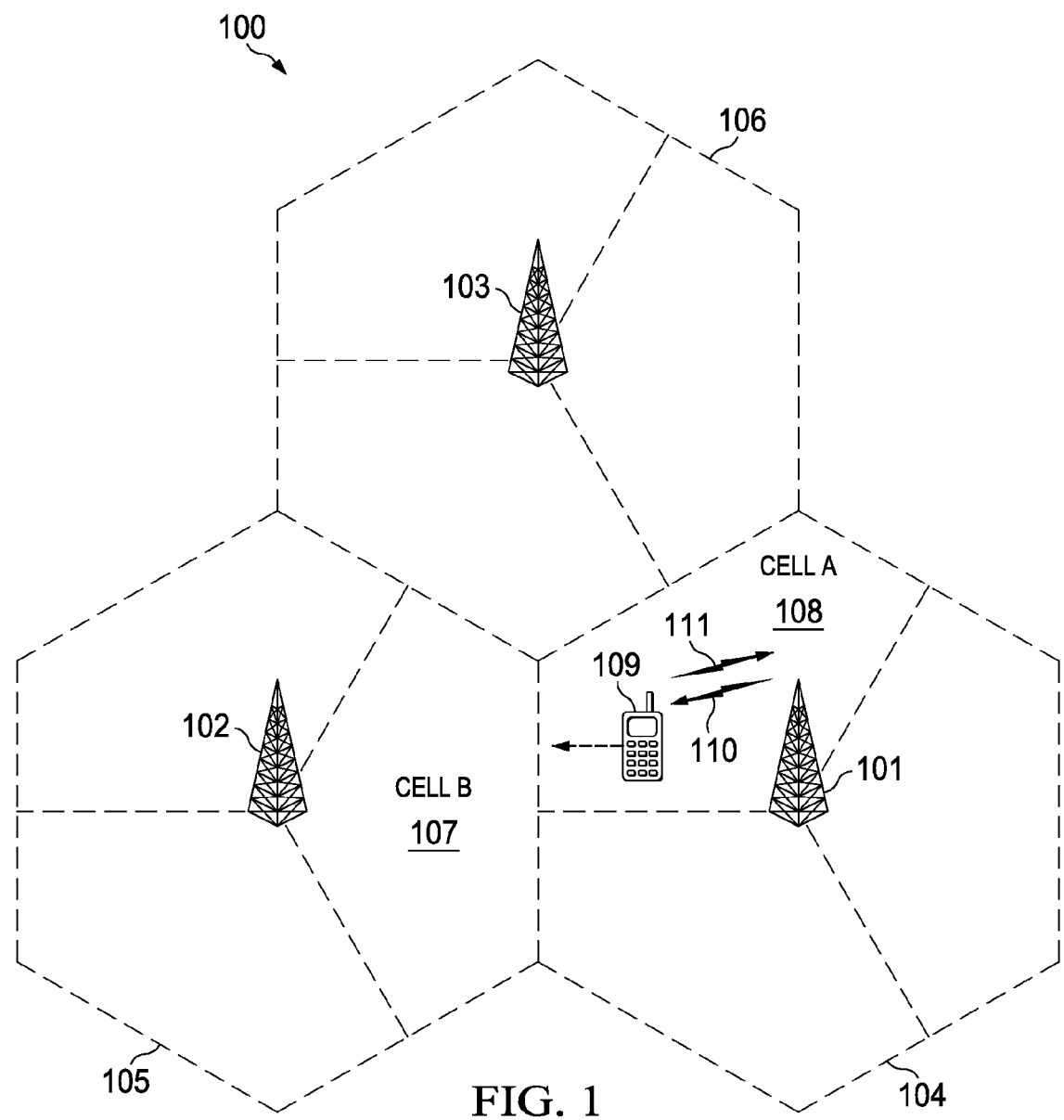
FIG. 1 is a diagram of a communication system of the present invention having three cells.

Referring to FIG. 1, there is an exemplary wireless telecommunications network 100. The illustrative telecommunications network includes base stations 101, 102, and 103. Each of base stations 101, 102, and 103 are operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station 101. Base station 101 is transmitting to and receiving transmissions from UE 109. As UE 109 moves out of Cell A 108, and into Cell B 107, UE 109 may be handed over to base station 102. Because UE 109 is synchronized with base station 101, UE 109 can employ non-synchronized random access to initiate handover to base station 102.

The UE 109 can also employ non-synchronous random access to request allocation of up-link 111 time or frequency or code resources. If UE 109 has data ready for transmission, for example, traffic data, measurements report tracking area update etc., UE 109 can transmit a random access signal on up-link 111. The random access signal notifies base station 101 that UE 109 requires up-link resources to transmit its data. Base station 101 responds by transmitting to UE 109, via down-link 110, a message containing the parameters of the resources allocated for UE 109 up-link transmission along with a possible timing error correction. After receiving the resource allocation and a possible timing advance message transmitted on down-link 110 by base station 101, UE 109 (possibly) adjusts its transmit timing and transmits its data on up-link 111 employing the allotted resources during the prescribed time interval.

Figure 2:
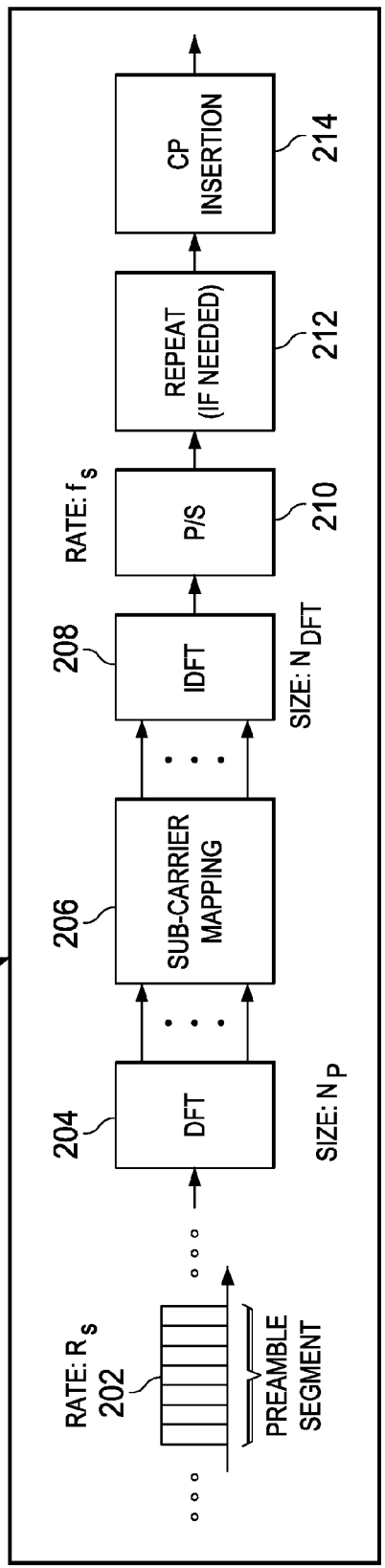
FIG. 2 is a block diagram of a transmitter of the present invention.

Referring now to FIG. 2, there is a block diagram of a wireless transmitter 200 of the present invention for transmitting a preamble 202 to a remote receiver. The preamble is preferably a CAZAC sequence for generating the random access preamble signal. CAZAC sequences are complex valued sequences with following two properties: 1) Constant Amplitude (CA), and 2) Zero Cyclic Autocorrelation (ZAC). Examples of CAZAC sequences include (but are not limited to): Chu Sequences, Frank-Zadoff Sequences, Zadoff-Chu (ZC) Sequences, and Generalized Chirp-Like (GCL) Sequences.

As is known in the art, Zadoff-Chu (ZC) sequences are defined by:

$$a_M(k) = \exp[j2\pi(M/N)[k(k+1)/2 + qk]] \qquad \text{for N odd}$$

$$a_M(k) = \exp[j2\pi(M/N)[k^2/2 + qk]] \qquad \text{for N even}$$

These are representative examples of CAZAC sequences. An alternative convention for ZC definition replaces "j" in the above formula by "−j." Either convention can be adopted. In the above formula, "M" and "N" are relatively prime, and "q" is any fixed integer. Also, "N" is the length of the sequence, "k" is the index of the sequence element (k is from {0, 1, ..., N−1}), and "M" is the index of the root ZC sequence. Making "N" a prime number maximizes the set of non-orthogonal root ZC sequences having optimal cross-correlation. Thus, when "N" is prime, there are "(N−1)" possible choices for "M," where each choice results in a distinct root ZC CAZAC sequence. In this invention, terms: Zadoff-Chu, ZC, and ZC CAZAC, are used interchangeably. Term CAZAC denotes any CAZAC sequence, like ZC, or otherwise.

In a preferred embodiment of the invention, random access preamble signal 202 is constructed from a CAZAC sequence, such as a ZC sequence. Additional modifications to the selected CAZAC sequence can be performed using any of the following operations: multiplication by a complex constant, DFT, IDFT, FFT, IFFT, cyclic shifting, zero padding, sequence block repetition, sequence truncation, sequence cyclic extension, and others. Thus, a preferred embodiment of the invention, UE 200 selects random access preamble signal 202, by selecting a CAZAC sequence and possibly performing a combination of described modifications to the selected CAZAC sequence. The CAZAC sequence is applied to DFT circuit 204 to produce a frequency domain signal. The frequency domain signal is then applied to sub-carrier mapping circuit 206, where the preamble is mapped to user selected tones. IDFT circuit 208 then converts the user selected tones to a time domain signal which is applied to parallel-to-serial converter 210. The resulting preamble may optionally be repeated to achieve the desired duration. Finally, a cyclic prefix is added to the preamble by circuit 214 prior to transmission to a remote receiver.

Figure 3:
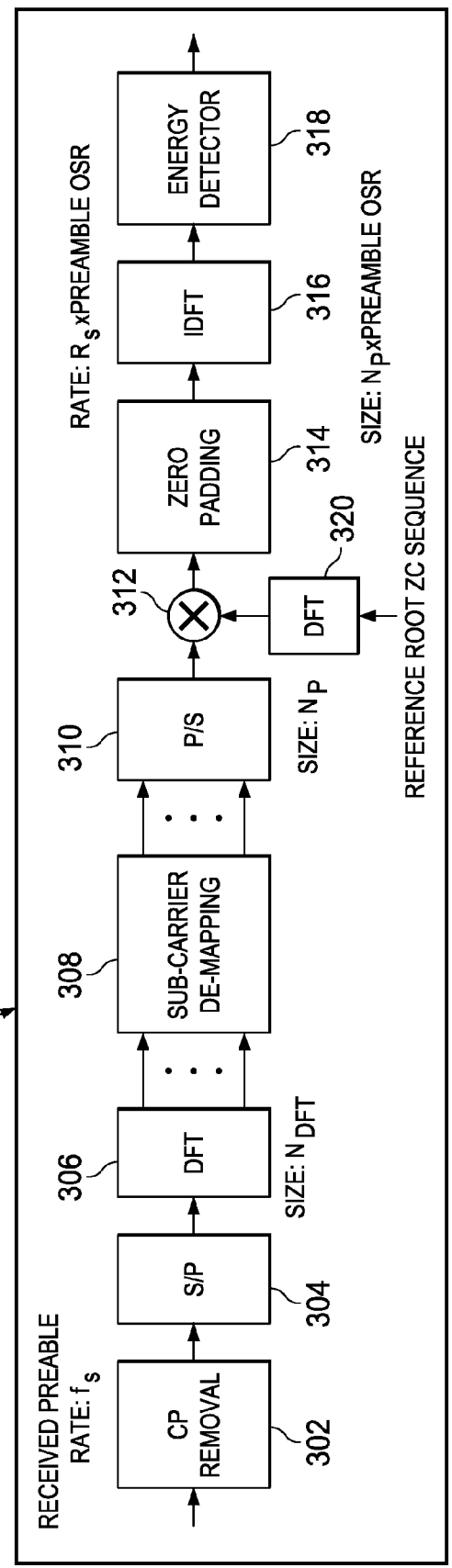
FIG. 3 is a block diagram of a receiver of the present invention.

Referring now to FIG. 3, there is an embodiment of a random access channel receiver 300 of the present invention. The received random access signal is applied to circuit 302 to remove the cyclic prefix. The resulting preamble is then applied to serial-to-parallel converter 304. Parallel preamble components are then applied to DFT circuit 306 to produce sub-carrier mapped tones. The mapped tones are then applied to demapping circuit 308. These demapped tones are equivalent to the output signal from DFT circuit 204 of transmitter 200 (FIG. 2). The demapped tones are applied to parallel-to-serial circuit 310 to produce a serial data stream. Product circuit 312 is coupled to receive the serial data stream as well as a reference root sequence from DFT circuit 320. The product circuit 312 computes a tone by tone complex multiplication of demapped tones with the reference tones. Circuit 314 adds zeros necessary to produce a correct sequence length. IDFT circuit 316 converts the multiplied frequency tones into time domain signals. These time domain signals include concatenated power delay profiles of all cyclic shift replicas of the preamble root sequence. Energy detector circuit 318 receives these time domain signals and identifies the received preamble sequences by detecting the time of peak correlation between received random access preamble and the reference ZC root sequence.

Figure 4:
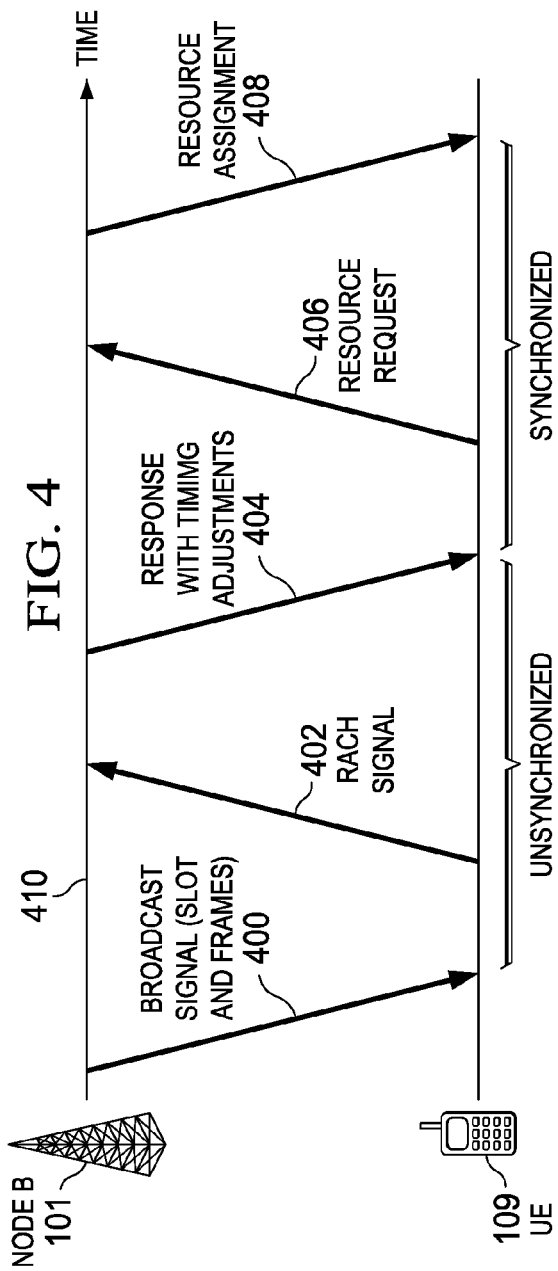
FIG. 4 is a diagram showing a procedure for establishing communications between user equipment (UE) and a base station (Node B)

Referring now to FIG. 4, there is a diagram showing a procedure for establishing communications via the RACH between UE 109 such as in FIG. 2 and a Node B 101 such as in FIG. 3. Time 410 is shown as a horizontal arrow to illustrate the following sequence. Node B 101 periodically transmits a broadcast signal 400 within the cell having slot and frame timing information for UE 109. UE 109 selects an appropriate CAZAC sequence and produces a preamble with appended cyclic prefix as previously described. UE 109 transmits this preamble 402 over the RACH to Node B 101. Node B 101 identifies the preamble and responds with timing adjustments 404 to synchronize communications and account for transmit delay. Once synchronized with Node B 101, UE 109 requests communication resources 406. Alternatively, the communication resource request might be included as part of RACH signal 402. Communication resources are then assigned 408 to UE 109 and synchronous communication begins over the PUSCH.

Figure 5:
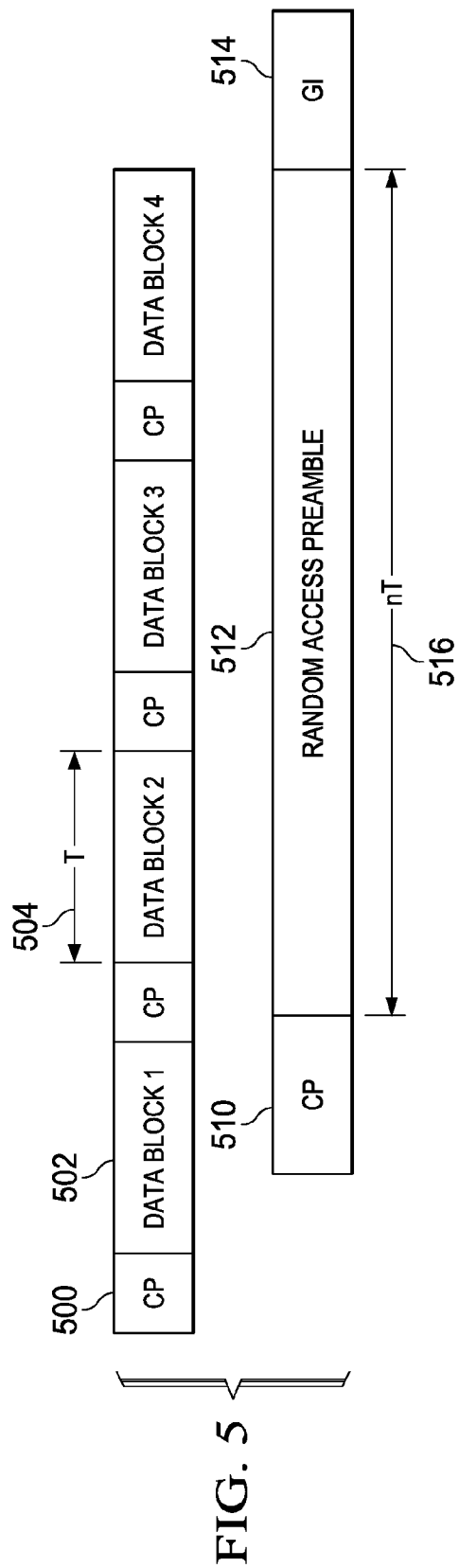
FIG. 5 is a diagram comparing data signals transmitted on a Physical Uplink Shared Channel (PUSCH) to a preamble transmitted on a Random Access Channel (RACH)

Turning now to FIG. 5, there is a diagram comparing data signals transmitted on a Physical Uplink Shared Channel (PUSCH) to a preamble transmitted on a Random Access Channel (RACH) according to the present invention. Each data block, for example data block 1 (502), has a respective cyclic prefix 500. By way of comparison, the RACH preamble 512 has a cyclic prefix 510 and a guard interval 514. According to a preferred embodiment of the present invention, the RACH preamble 512 has duration of 800 µs and is allocated six frequency resource blocks (RB) of 180 kHz each. Cyclic prefix 510 and guard interval 514 have duration of 102.6 µs and 97.4 µs, respectively. Prior to synchronization, as previously discussed with regard to FIG. 4, the PUSCH data blocks and the RACH preamble are neither aligned nor have the same duration. A strictly orthogonal relationship, therefore, cannot be achieved. Each OFDM tone of the RACH preamble (and PUSCH data block) carries a modulated symbol according to a frequency overlapped time limited orthogonal structure. The frequency tones overlap with each other so that in the center of a tone, the spectral envelopes of all surrounding tones are null. This principle allows multiplexing of different transmissions in the same system bandwidth in an orthogonal manner. However, this only holds true if the sub-carrier spacing δf is kept constant. δf is equal to the inverse of the OFDM symbol duration T, used to generate the frequency tones by DFT. Because the preamble OFDM symbol is longer than the data OFDM symbol, the sub-carrier spacing of the preamble OFDM symbol will be shorter than the sub-carrier spacing of the data OFDM symbol. Fixing the RACH preamble 512 duration 516 to an integral multiple (nT) of the data block duration 504 (T), however, provides some degree of commensurability and interference reduction. This assumes the RACH preamble sampling frequency is an integral multiple of the data symbol sub-carrier spacing. A similar reasoning is used, below, for dimensioning the guard bands surrounding the preamble: the preamble guard band size on each side of the preamble should be as close as possible to an integer number of data sub-carriers. In a preferred embodiment, the data symbol duration is 66.667 µs resulting in 15 kHz data sub-carrier spacing and the preamble duration is 800 µs resulting in 1.25 kHz preamble sub-carrier spacing. One RB equals 12 data sub-carriers and the preamble is allocated 6 RB or 72 data sub-carriers or 864 preamble sub-carriers.

Figure 6:
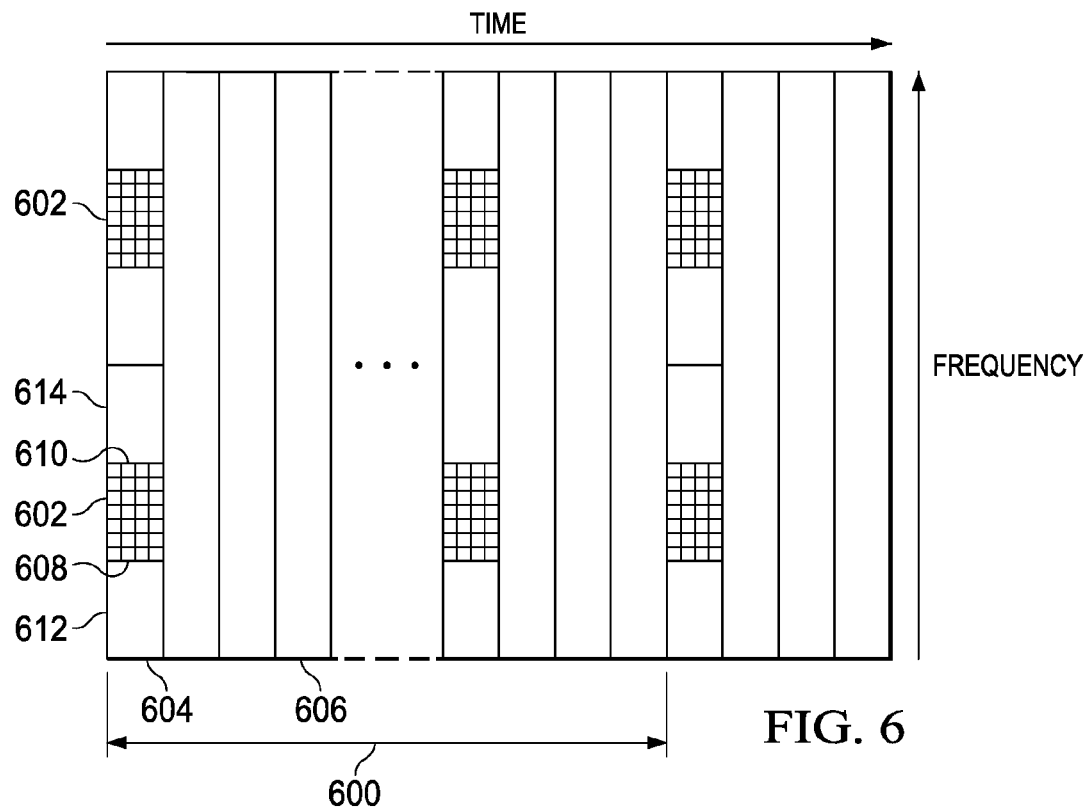
FIG. 6 is a diagram of a radio frame according to the present invention.

Referring now to FIG. 6, there is a diagram of a radio frame 600 according to the present invention that may be allocated for the RACH and PUSCH. The radio frame illustrates an exemplary allocation to scheduled (PUSCH) and random access channels (RACH). The vertical axis of radio frame 600 is frequency and the horizontal axis is time. Radio frame 600 includes a plurality of sub-frames, such as sub-frame 606, which are reserved for PUSCH transmissions. Both PUSCH (612 and 614) as well as RACH 602 are allocated to sub-frame 604. Frequency boundaries 608 and 610 are indicated between RACH allocation 602 and PUSCH allocations 612 and 614, respectively. Note that the illustrated number and spacing of random access channels is purely a matter of convenience; a particular transmission frame implementation may allocate more or less resource to random access channels. Including multiple random access channels allows multiple UEs to simultaneously transmit a random access signal without collision. However, because each UE independently chooses the random access channel on which it transmits, collisions between UE random access signals may occur and must be resolved.

Figure 7:
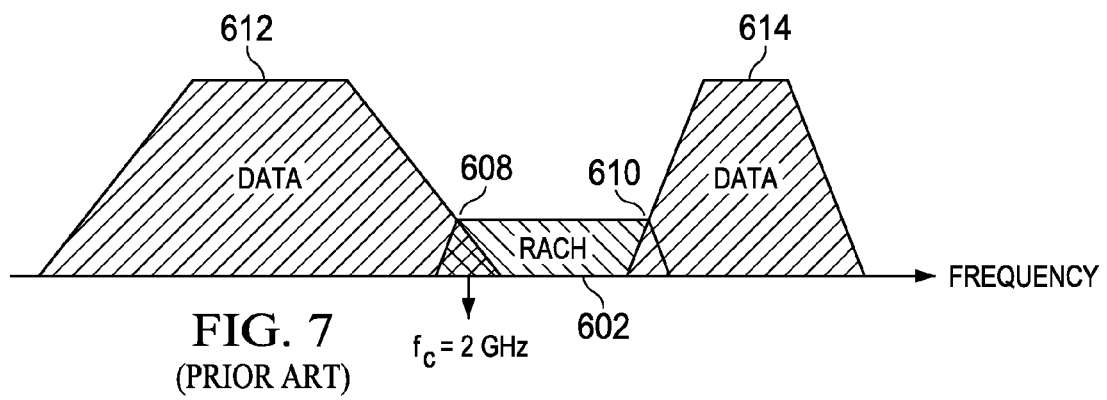
FIG. 7 is a diagram of the prior art showing a relationship between data signals on the PUSCH and a preamble on RACH.
Figure 10:
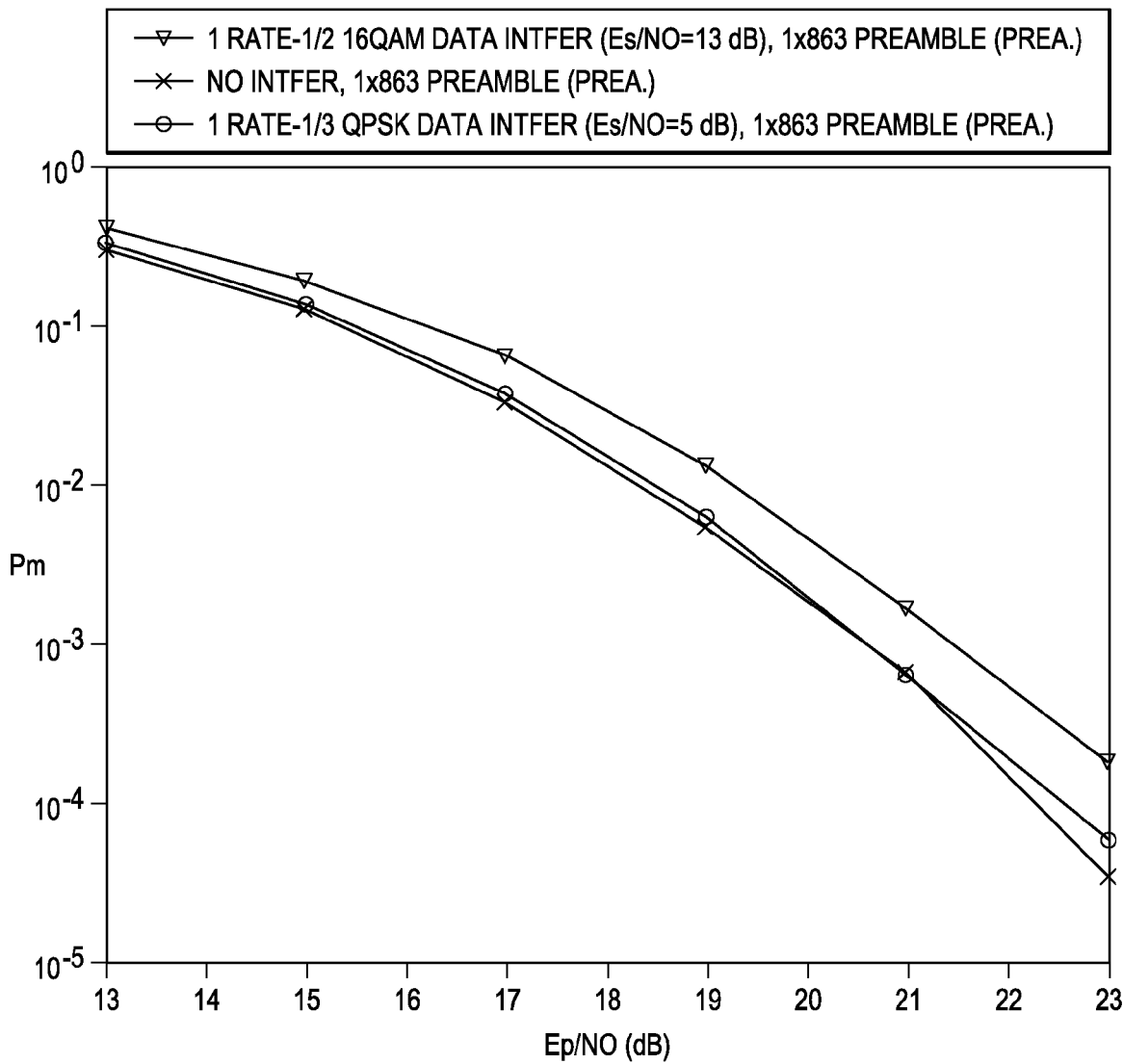
FIG. 10 is a simulation showing a miss detection rate of a RACH preamble for a 13.8 km cell radius.

Referring to FIG. 7, there is a diagram of the prior art showing a relationship between data signals on the PUSCH and a preamble on RACH at frequency boundaries 608 and 610. Reference numerals are the same as in FIG. 6. Both PUSCH data signals (612 and 614) and RACH preamble 602 are transmitted on carrier frequency $f_C$. They are modulated and shifted in time to produce signal overlaps at 608 and 610. This overlap does not produce significant interference for the PUSCH data signals (612 and 614), which may be more than 15 dB greater than the RACH preamble 602. The overlap does produce significant interference to the RACH preamble during signal acquisition with Node B. Referring to FIG. 10, there is a simulation showing the probability of a missed acquisition (Pm) along the vertical axis due to this interference. The horizontal axis is the signal-to-noise ratio Ep/N0 (dB). The upper curve (triangle) illustrates the miss probability for rate 1/2, 16-QAM encoding. The middle curve (circle) illustrates the miss probability for rate 1/3, QPSK encoding. The lower curve illustrates the miss probability without interference for comparison. All three curves assume 863 sub-carrier preamble and a 13.8 km cell radius. The QPSK curve adds only marginal interference due to its relatively low average signal-to-noise (SNR) ratio (5 dB). The 16-QAM curve, however, has an average SNR of 13 dB and produces about 1 dB performance loss at Pm=1%.

Figure 8:
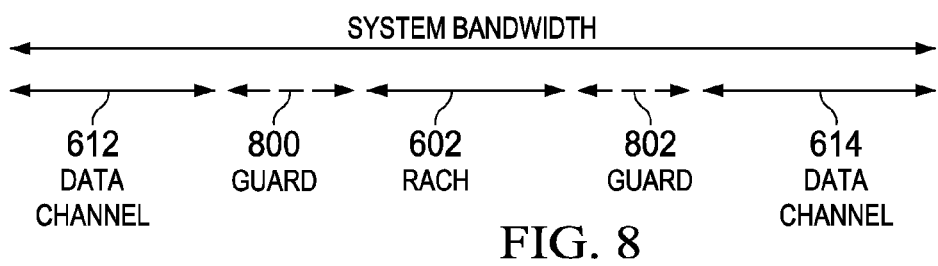
FIG. 8 is a diagram of the present invention showing a relationship between data signals on the PUSCH and a preamble on RACH.

Turning now to FIG. 8, there is a diagram of the present invention showing a relationship between data signals on the PUSCH and a preamble on RACH. Common reference numerals refer back to the radio frame of FIG. 6. The sub-frame 604 bandwidth is shown along the horizontal axis. RACH preamble 602 is situated between PUSCH data blocks 612 and 614. However, the UE now produces intervening guard bands 800 and 802 to separate the RACH preamble tones (602) from the PUSCH tones (612 and 614). This advantageously reduces interference and resulting cross talk between the signals, thereby greatly improving UE detection probability by Node B.

Figure 9:
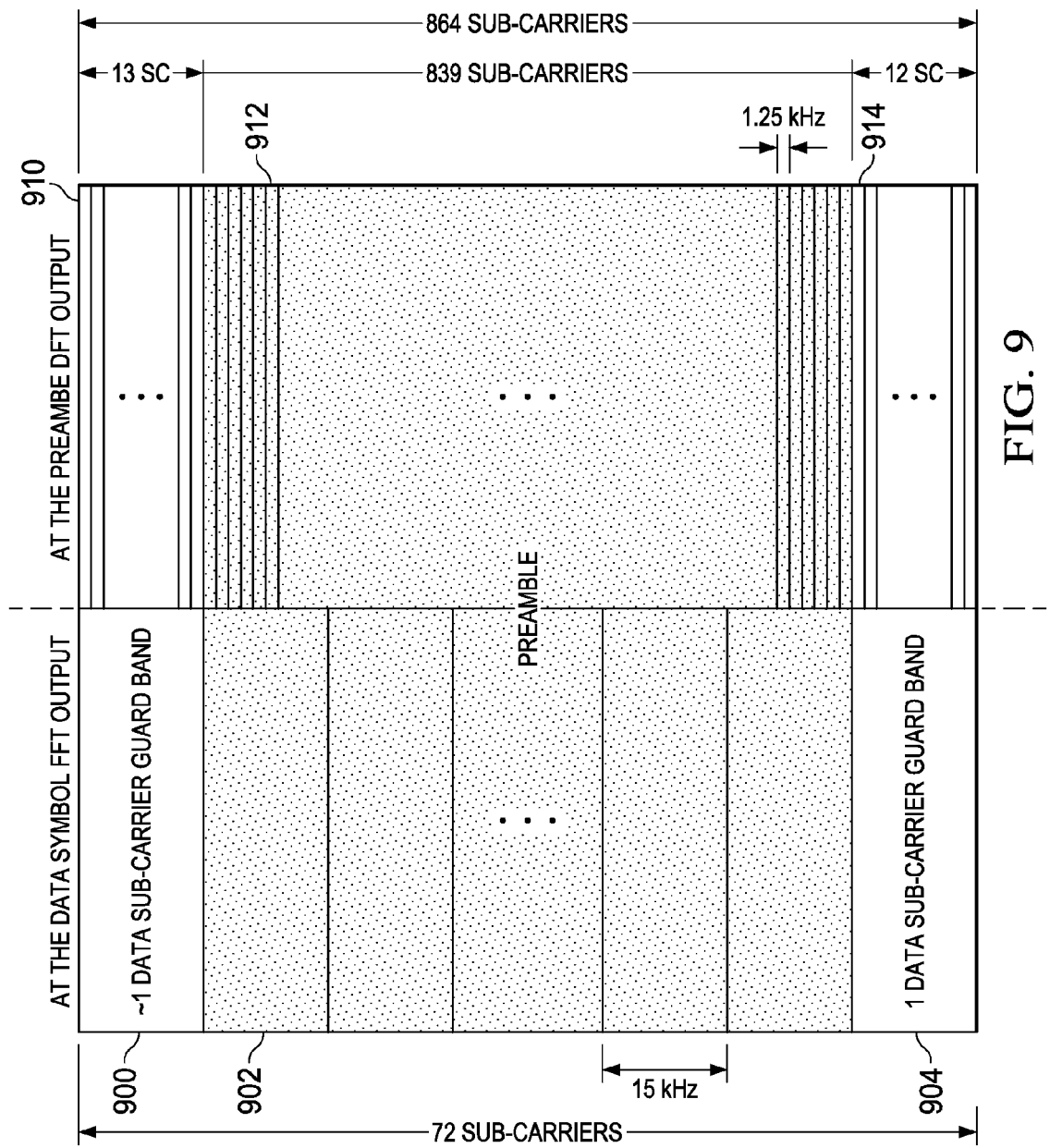
FIG. 9 is a diagram showing PUSCH and RACH mapping onto allocated sub-carriers according to the present invention.

Referring to FIG. 9, there is a diagram showing PUSCH and RACH mapping onto allocated sub-carriers according to the present invention. The right half of the diagram corresponds to the RACH preamble as observed at the DFT 204 output (FIG. 2). The left half of the diagram corresponds to the data symbol FFT output (not shown), which is comparable to DFT 204 output but for data symbols transmitted on the PUSCH. The PUSCH (left) is preferably divided into 72 sub-carriers. Each of the 72 sub-carriers has a 15 kHz bandwidth for a 1.08 MHz bandwidth. Only the center 70 sub-carriers 902 are used. Sub-carrier regions 900 and 904 are reserved as guard bands. The RACH preamble (right) is preferably allocated 864 sub-carriers. Each of the 864 sub-carriers has a 1.25 kHz bandwidth for a 1.08 MHz bandwidth. Only the center 839 sub-carriers 912 are used. Sub-carrier regions 910 and 914 are reserved as guard bands to reduce interference due to cross talk as previously discussed.

Figure 11:
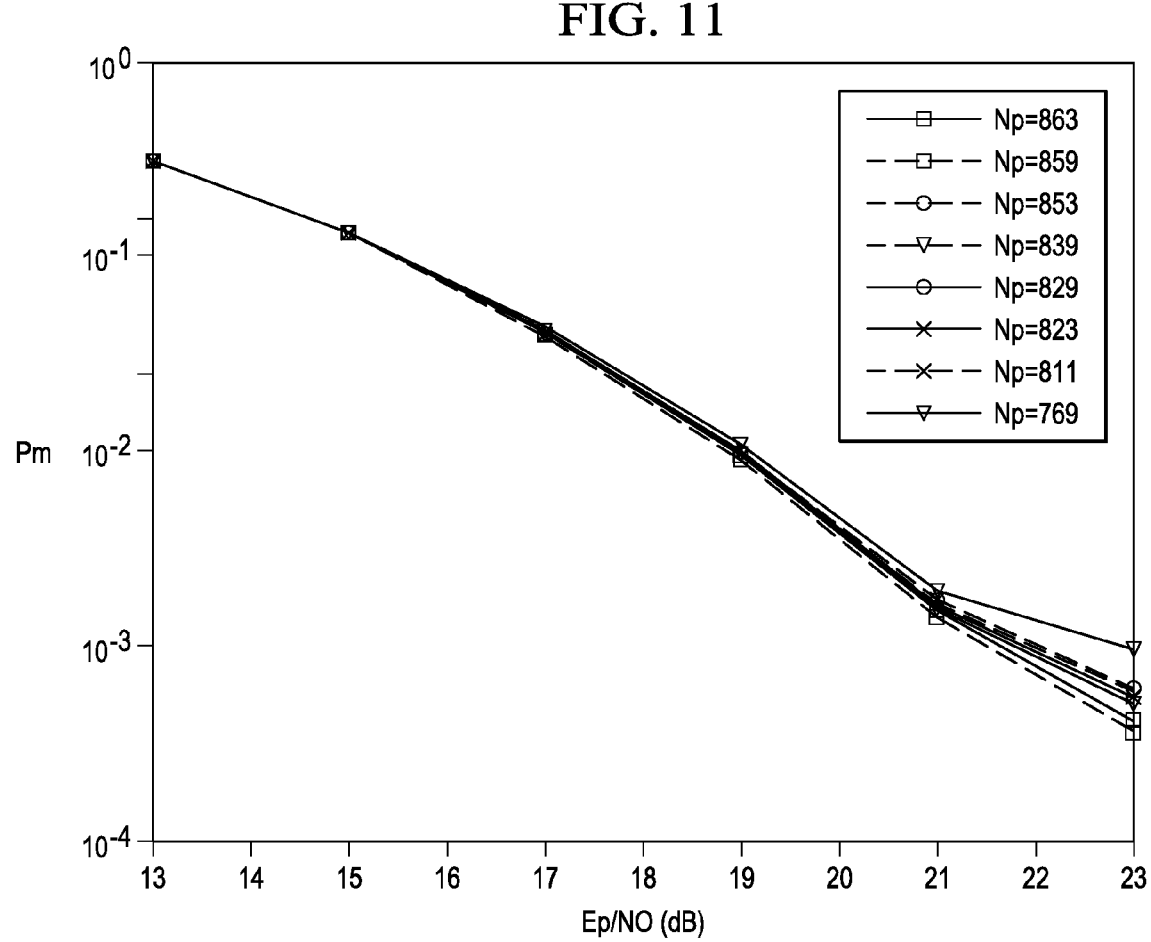
FIG. 11 is a simulation showing a miss detection rate of a RACH preamble without interference for Np sub-carriers and a 13.0 km cell radius.
Figure 12:
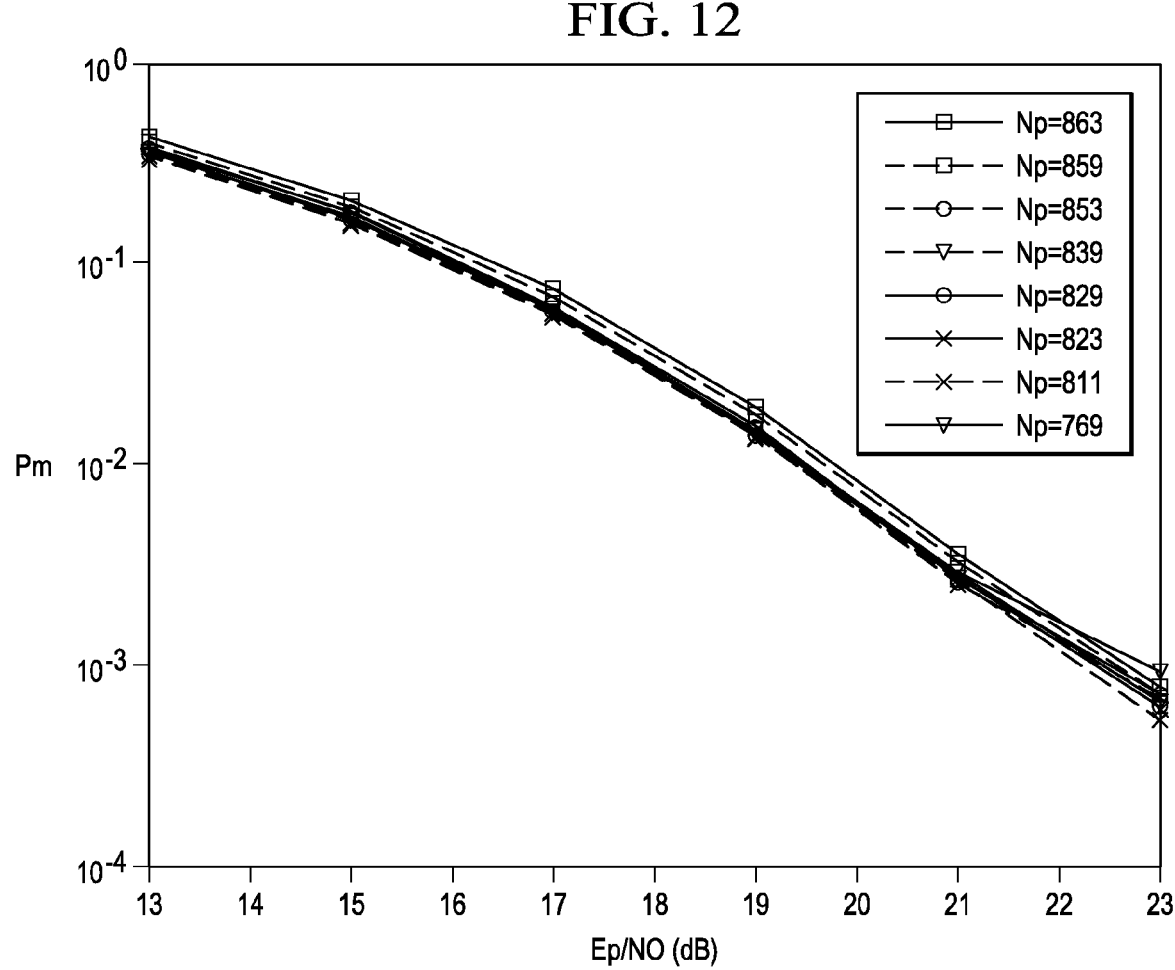
FIG. 12 is a simulation showing a miss detection rate of a RACH preamble with interference for Np sub-carriers and a 13.0 km cell radius.

Turning now to FIGS. 11 and 12, there are simulations of the RACH preamble miss detection rate for a 13 km cell radius for various numbers of preamble sub-carriers. The simulation of FIG. 11 shows the miss probability (Pm) without interference. The simulation of FIG. 12 shows the miss probability (Pm) with interference. Sequence length Np=769 appears to be the worst, due to a lower preamble sampling rate. In the absence of interference (FIG. 11), however, there is no significant difference between the various preamble sequence lengths. FIG. 12 shows there is a diminishing return in detection rate improvement while the preamble length is below Np=853. In particular, a 0.5 dB loss can be obtained with a preamble length of 839 where Pm=1%. Moreover, the sequence length Np=839 is also a best trade-off choice, since it corresponds to 69.91 data symbol sub-carriers for each OFDM symbol. This provides a 72−69.91=2.09 sub-carrier guard band region, and is very close to one symbol sub-carrier on each side of the preamble (900 and 904). Thus, Np=839 is a near optimal prime length RACH preamble sequence. A length 839 CAZAC preamble sequence is advantageously orthogonal with respect to other CAZAC sequences over the RACH. When mapped into the 864 sub-carriers, upper 912 and lower 914 guard bands are provided to reduce interference due to cross talk with the PUSCH data symbols.

Referring now to FIG. 13, there is a summary table showing Baseline and Alternate non-synchronized random access (NSRA) preamble specifications according to the present invention. Here, the NSRA preamble has the same meaning as the RACH preamble. From left to right, the Baseline preamble sub-carriers are each 1.25 kHz. A total of 864 such sub-carriers are allocated. The preamble duration is 800 μs and comprises 839 usable sub-carriers. The preamble sampling rate is 1.04875 MHz. Remaining columns are based on spectrum allocation. For example, a 1536 IDFT samples for a 1.25 MHz spectrum allocation provides a 1.92 MHz (1536/800 μs) system sampling rate. As discussed with regard to FIG. 5, the cyclic prefix and guard interval are 102.6 μs and 97.4 μs, respectively. Alternate NSRA preamble specifications show an equivalent structure with 432 sub-carriers, each having a 2.5 kHz bandwidth. These as well as other variations advantageously produce an orthogonal relation between selected RACH preambles as well as reduced interference due to cross talk between PUSCH data symbols and the RACH preamble.

Still further, while numerous examples have thus been provided, one skilled in the art should recognize that various modifications, substitutions, or alterations may be made to the described embodiments while still falling with the inventive scope as defined by the following claims. Other combinations will be readily apparent to one of ordinary skill in the art having access to the instant specification.

What is claimed is:

1. A method of establishing communications with a remote transceiver that receives data block signals from other transceivers, comprising the steps of:
    producing a random access preamble on a plurality of preamble sub-carriers each having a first bandwidth in a frequency spectrum;
    wherein a plurality of data block signal sub-carriers having a second bandwidth different from the first bandwidth is allocated adjacent to the plurality of preamble sub-carriers in the frequency spectrum for simultaneous transmission of the data signals by the other transceivers;
    producing a guard band having a bandwidth allocated between the random access preamble and the adjacent data block signals using another plurality of the preamble sub-carriers;
    wherein the random access preamble has a total bandwidth approximately equal to an integer multiple of the bandwidth of an adjacent one of the plurality data signal sub-carriers;
    wherein the total bandwidth of the guard band is approximately equal to an integer multiple of the second bandwidth of an adjacent one of the plurality of data signal sub-carriers; and
    transmitting the random access preamble to the remote transceiver.

2. A method as in claim 1, wherein the random access preamble comprises a prime length Constant Amplitude Zero Auto Correlation (CAZAC) sequence, and wherein the random access preamble has a cyclic prefix.

3. A method as in claim 2, wherein the CAZAC sequence comprises one of a Zadoff-Chu sequence, a Frank sequence, and a Generalized Chirp-Like sequence.

4. A method as in claim 2, wherein the CAZAC sequence is repeated.

5. A method as in claim 1, wherein each data block signal has a respective cyclic prefix.

6. A method as in claim 1, wherein the guard bands comprise additional sub-carriers, each sub-carrier having one of the first and second bandwidth.

7. A method as in claim 6, wherein a bandwidth of the preamble is a prime length closest to the second bandwidth.

8. A method as in claim 1, wherein the data block signals and the preamble comprise Orthogonal Frequency Division Multiplex (OFDM) signals, and wherein a duration of the preamble and the data block signals is determined prior to addition of a cyclic prefix.

9. A method as in claim 1, wherein the data block signals are transmitted over a Physical Uplink Shared Channel (PUSCH) and the preamble is transmitted over a Random Access Channel (RACH).

10. A method as in claim 1, wherein:
    the plurality of preamble sub-carriers having the first bandwidth comprises 864 preamble sub-carriers each having a bandwidth of 1.25 kHz;
    the plurality of data signal sub-carriers having the second bandwidth comprises 72 sub-carriers each having a bandwidth of 15 kHz, and
    the random access preamble comprises 839 preamble sub-carriers selected from a center portion of the plurality of preamble sub-carriers.

11. A method as in claim 10, wherein the guard band comprises either 12 or 13 preamble sub-carriers, such that a total bandwidth of the guard band is approximately equal to the second bandwidth of one data signal sub-carrier.

12. A method of establishing communications with a remote transceiver, comprising the steps of:
receiving data block signals from a first transceiver on a plurality of data signal sub-carriers in a frequency spectrum, each data signal sub-carrier having a first bandwidth;
simultaneously receiving a preamble from a second remote transceiver on a plurality of preamble sub-carriers in the frequency spectrum adjacent to the data block signals, each preamble sub-carrier having a second bandwidth different from the first bandwidth, wherein the preamble has a total bandwidth approximately equal to an integer multiple of the first bandwidth of an adjacent one of the plurality of data signal sub-carriers; and
wherein the plurality of data signal sub-carriers is separated from the plurality of preamble subcarriers by a guard band having a bandwidth, wherein the guard band comprises additional preamble sub-carriers having the second bandwidth and wherein the total bandwidth of the guard band is approximately equal to an integer multiple of the first bandwidth of one data block sub-carrier; and
acknowledging receipt of the preamble to the second remote transceiver.

13. A method as in claim 12, wherein the preamble comprises a prime length Constant Amplitude Zero Auto Correlation (CAZAC) sequence.

14. A method as in claim 13, wherein the CAZAC sequence comprises one of a Zadoff-Chu sequence and a Frank sequence.

15. A method as in claim 13, wherein the CAZAC sequence is repeated.

16. A method as in claim 12, wherein each data block signal has a respective cyclic prefix.

17. A method as in claim 12, wherein the data block signals and the preamble comprise Orthogonal Frequency Division Multiplex (OFDM) signals, and wherein a duration of the preamble and the data block signals is determined prior to addition of a cyclic prefix.

18. A method as in claim 12, wherein the data block signals are transmitted over a Physical Uplink Shared Channel (PUSCH) and the preamble is transmitted over a Random Access Channel (RACH).

19. A method as in claim 12, wherein:
the plurality of preamble sub-carriers having the second bandwidth comprises 864 sub-carriers each having a bandwidth of 1.25 kHz;
the plurality of data signal sub-carriers having the first bandwidth comprises 72 sub-carriers each having a bandwidth of 15 kHz, and
the preamble comprises 839 preamble sub-carriers selected from a center portion of the plurality of preamble sub-carriers.

20. A method as in claim 19, wherein the guard band comprises either 12 or 13 preamble sub-carriers, such that a total bandwidth of the guard band is approximately equal to the first bandwidth of one data signal sub-carrier.

21. A system comprising a transmitter, wherein the transmitter comprises:
a logic module configured to form a random access preamble using a selected Constant Amplitude Zero Auto Correlation (CAZAC) sequence;
a time domain to frequency domain circuit coupled to transform the random access preamble to the frequency domain;
a sub-carrier mapping module coupled to receive the frequency domain random access signal and configured to produce a random access preamble on a plurality of preamble sub-carriers each having a first bandwidth in a frequency spectrum;
wherein a plurality of data block signal sub-carriers having a second bandwidth different from the first bandwidth is allocated adjacent to the plurality of preamble sub-carriers in the frequency spectrum for simultaneous transmission of the data signals by the other transceivers;
wherein the sub-carrier mapping module is also configured to produce a guard band having a bandwidth allocated between the random access preamble and the adjacent data block signals using another plurality of the preamble sub-carriers;
wherein the random access preamble has a total bandwidth approximately equal to an integer multiple of the bandwidth of an adjacent one of the plurality data signal sub-carriers; and
wherein the total bandwidth of the guard band is approximately equal to an integer multiple of the second bandwidth of an adjacent one of the plurality of data signal sub-carriers.

* * * * *